United States Patent

[11] 3,595,211

| [72] | Inventor | Wayne M. Brehob<br>Dearborn, Mich. |
|---|---|---|
| [21] | Appl. No. | 56,571 |
| [22] | Filed | July 20, 1970 |
| [45] | Patented | July 27, 1971 |
| [73] | Assignee | Ford Motor Company<br>Dearborn, Mich.<br>Continuation-in-part of application Ser. No.<br>799,293, Feb. 14, 1969, now abandoned. |

[54] INTERNAL COMBUSTION ENGINE AIR INTAKE CONTROL MEANS
5 Claims, 1 Drawing Fig.

| [52] | U.S. Cl. | 123/119 B |
|---|---|---|
| [51] | Int. Cl. | F02m 25/06,<br>F02f 9/00 |
| [50] | Field of Search | 123/119 B |

[56] References Cited
UNITED STATES PATENTS

| 2,737,935 | 3/1956 | Olson | 123/119 B |
|---|---|---|---|
| 3,198,208 | 8/1965 | Tramontini | 123/119 B |
| 3,259,378 | 7/1966 | Mennesson | 123/119 UX |
| 3,312,207 | 4/1967 | Martin et al. | 123/119 B |
| 3,364,910 | 1/1968 | Hulse | 123/119 B |
| 3,381,673 | 5/1968 | Drysdale | 123/119 B |
| 3,512,508 | 5/1970 | Winkler | 123/119 |

FOREIGN PATENTS

| 1,014,746 | 12/1965 | Great Britain | 123/119 B |
|---|---|---|---|

*Primary Examiner*—Wendell E. Burns
*Attorneys*—John R. Faulkner and Roger E. Erickson

ABSTRACT: An internal combustion engine for a motor vehicle having air intake control means that accurately control the volume of air included in the air-fuel combustion mixture. The intake of ambient air through the engine carburetor is metered and fuel introduced downstream in direct proportion. A portion of this metered air is directed to the crankcase for ventilation purposes prior to introduction of fuel and is exhausted from the lubrication circuit into the engine intake manifold. The lubrication circuit of the engine otherwise is sealed against the entry of ambient air.

PATENTED JUL 27 1971  3,595,211
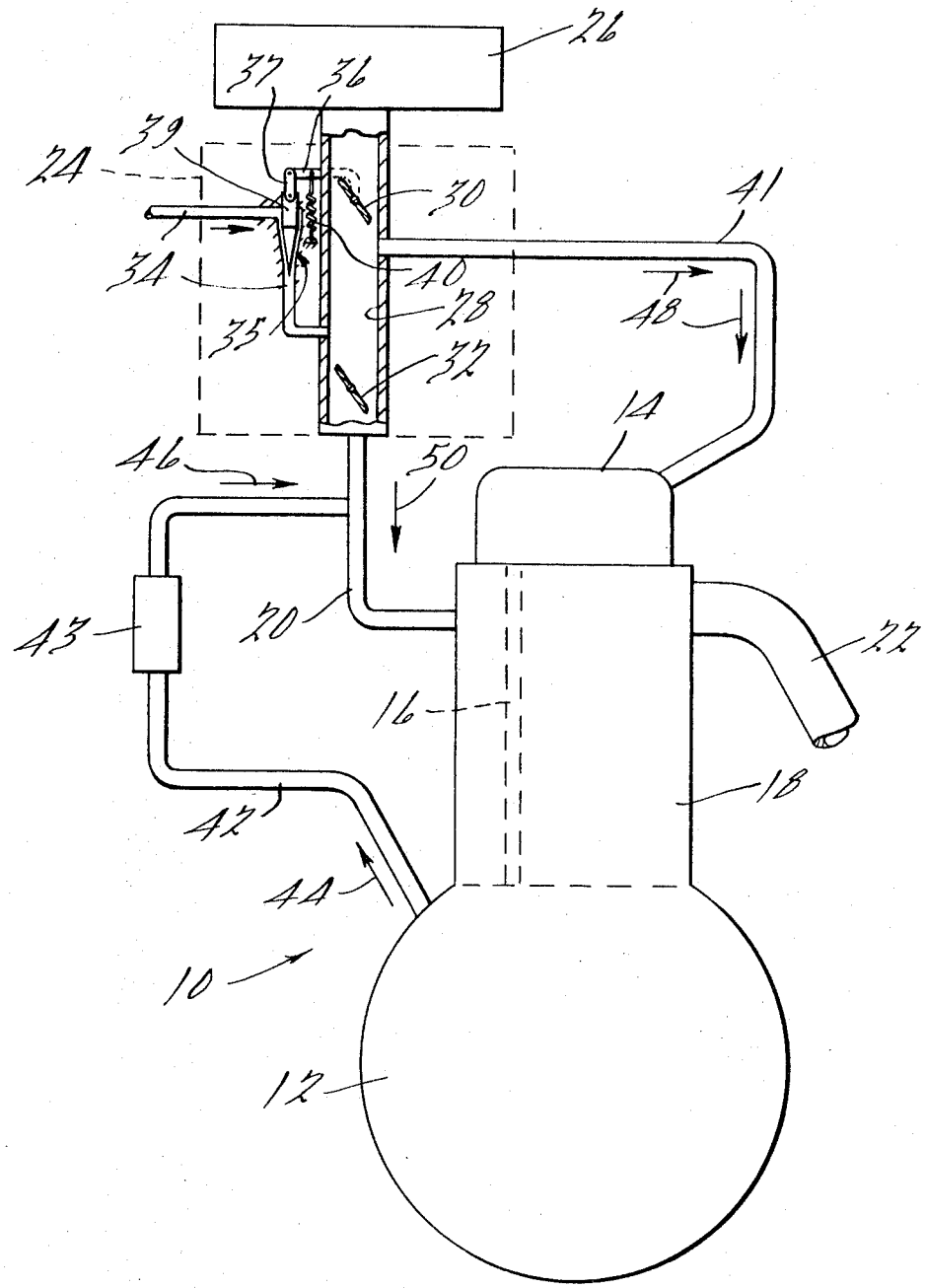
INVENTOR.
Wayne M. Brehob 3,595,211

INTERNAL COMBUSTION ENGINE AIR INTAKE CONTROL MEANS

This is a continuation-in-part of application Ser. No. 799,293, filed Feb. 14, 1969 now abandoned.

BACKGROUND OF THE INVENTION

It long has been recognized that for optimum internal combustion engine operating efficiency, the air-fuel mixture ratio of the charge burned in the engine accurately should be controlled. Engine carburetors available commercially accurately measure the air and fuel comprising the engine charge that is formed in the carburetor and directed to the engine through an intake manifold. This air-fuel charge becomes diluted, however, by mixture with additional air between the time of the formation of the charge and the burning of the charge in the combustion chamber.

A source of this dilution is the necessary introduction of ventilating air into the engine lubrication circuit, including the crankcase and valve galley. Entry of ventilating air to the lubrication circuit conventionally is accomplished by vent means that communicate between the crankcase and the atmosphere and allow an unrestricted amount of air to enter the crankcase. A portion of this crankcase ventilating air finds its way into the engine valve galley and leaks by the intake valve guides into the intake manifold and/or combustion chamber. Such leakage especially is prevalent at engine idle speeds.

The remaining crankcase ventilation air and blowby gases present in the crankcase leave the crankcase by the conventional "positive crankcase ventilation" or PCV system. This system includes a fluid conduit interconnecting the crankcase and the intake manifold. The gases drawn into the intake manifold through the PCV system contain air that further dilutes the charge formed in the carburetor.

Previous steps taken to correct this problem have comprised attempts to compensate for the additional air added to the charge by enriching the air-fuel mixture. Such compensations have not proven successful because the volume of additional air entering combustion via the lubrication system varies from engine to engine and with engine wear.

It is an object of this invention to provide an internal combustion engine wherein the above-described, undesirable dilution of the air-fuel charge formed by the carburetor is prevented. This is accomplished according to this invention by allowing only air metered by the engine carburetor to be part of combustion while still providing for adequate ventilation of the engine lubrication system.

SUMMARY OF THE INVENTION

Internal combustion air intake control means constructed in accordance with this invention are adapted for utilization in an internal combustion engine having a ventilated fluid lubricant circuit. Air-fuel intake means are connected to the engine. Charge-forming means are connected to the air-fuel intake means upstream of the engine. These charge-forming means include air-metering means cooperatively associated with the fuel-metering means. First fluid conduit means interconnect the charge-forming means, downstream of the air-metering means, and the engine lubricant circuit. It is through this first fluid conduit means that air is supplied to the lubricant circuit. The lubricant circuit otherwise is sealed against the entry of ambient air. Second fluid conduit means interconnect the lubricant circuit and the air-fuel intake means and cooperate with the first conduit means to provide ventilation for the lubricant circuit. The second fluid conduit means include a one-way valve that prevents fluid flow from the first conduit means to the lubricant circuit through the second conduit means.

DESCRIPTION OF THE DRAWING

The drawing is a schematic representation of an internal combustion engine and attendant structure including air intake control means constructed in accordance with this invention.

DETAILED DESCRIPTION OF THE INVENTION

Referring now in detail to the drawing, the numeral 10 denotes generally a conventional internal combustion engine having a crankcase portion 12 and a cylinder head portion 14. The conventional engine fluid circuit for lubricating oil includes crankcase 12 and the valve galley within head 14. This circuit also includes fluid passageway 16 formed in block 18 and interconnecting crankcase 12 and head 14.

An air-fuel intake manifold 20 is connected to the portion 12 as is an exhaust gas manifold 22. Connected to manifold 20 upstream of engine 10 is a charge-forming device or carburetor that schematically is illustrated as that portion of the structure within the dotted line 24. An air intake means in the form of an air cleaner and filter 26 is secured to the charge-forming device upstream of the latter.

An induction passage 28, opening from air cleaner 26, is formed in the carburetor 24 in which a combustible charge is formed and delivered to the intake manifold 20. An air-metering valve 30 is mounted within the induction passage and is pivotal in response to airflow admitted from the air cleaner 26. Downstream of air valve 30 is a throttle valve 32, pivotally mounted within induction passage 28 and manually controllable by the vehicle operator.

A fuel inlet line 34, connected to a pressurized source of fuel remote from the carburetor, introduces fuel into the induction passage 28 at a position between the air valve 30 and the throttle valve 32. A needle valve assembly 35 comprises a fuel-metering means and is operatively connected to the air valve 30 to permit fuel flow through line 34 in proportion to the airflow through valve 30. Lever 36 and link 37 interconnect air valve 30 and tapered needle 39 to move the needle in a generally vertical direction. Spring 40 biases the air valve to a closed position.

It thus may be appreciated that air entering induction passage 28 through air cleaner 26 is metered by air valve 30 prior to the proportionate introduction of fuel into the induction passage through fuel line 34. Carburetors that operate in this manner are generally known as air valve carburetors and are commercially available.

In order that this air-fuel charge contains the proper amount of air when the charge is burned in the combustion chamber, this invention proposes the elimination of the conventional lubricant circuit breather vent that allows unrestricted amounts of ventilating air to enter the engine-lubricating circuit. In order to provide for the necessary ventilation of the engine-lubricating circuit, a conduit 41 is provided that interconnects induction passage 28, at a point downstream of air valve 30 but upstream of the discharge fuel inlet 34, and the engine-lubricating circuit. In the preferred embodiment of this invention, conduit 41 terminates remote from induction passage 28 at head 14. The engine-lubricating system comprising head 14, passageway 16 and crankcase 12 that is ventilated by air that has been metered by air valve 30 within the carburetor. The engine-lubricating system otherwise is sealed against the entry of ambient air.

Engine-lubricating circuit ventilation is completed by the conventional positive crankcase-ventilating system comprising a fluid conduit 32 interconnecting crankcase 12 and intake manifold 20. Conduit 42 includes a one-way valve 43 that allows fluid to flow in the direction illustrated by the arrows 44 and 46 only.

It thus may be seen that the only air entering the engine-lubricating system enters this system through conduit 38 in the direction illustrated by the arrows 48. This air already has been measured with respect to fuel requirements within the engine carburetor and, when combined with the air-fuel mixture directed from the carburetor into the intake manifold as illustrated by the arrow 50, forms the correct air-fuel mixture for combustion.

The air entering the engine-lubricating system through conduit 41 finds its way to the engine combustion chamber in either of two ways. Some of this air leaks into the combustion chamber and/or intake manifold from the engine head valve galley through intake valve guides. The remainder of this ventilating air is directed through conduit 42 and positive crankcase ventilation valve 43 to manifold 20 due to the presence of engine vacuum within manifold 20.

It thus may be seen that this invention provides an internal combustion engine having means to precisely regulate the intake of air that enters into combustion within the engine and to accurately meter the fuel in direct response to the air intake. The regulation of intake air is provided by the elimination of the conventional engine-lubricating system breather vent that permits unrestricted entry of air into the engine-lubricating system. Rather, ventilation of the engine-lubricating system is accomplished by means of air that first is metered with respect to fuel to be added within the engine carburetor, is directed to the engine-lubricating system prior to the introduction of fuel and is joined with the air-fuel mixture formed in the engine carburetor either by leakage through intake valve guides or by passage through the engine positive crankcase ventilation system.

I claim:

1. In an internal combustion engine having a fluid lubricant circuit,
    a charge-forming device including
        an induction passage for supplying a fuel-air mixture to engine combustion chambers,
        air intake means to the induction passage,
        an air-metering means in the induction passage movable in response to airflow admitted from the air intake means, and
        fuel-metering means introducing fuel to the induction passage downstream of the air-metering means and being responsive to movements of the air-metering means to admit fuel in proportion to the airflow therethrough,
    first fluid-conduit means connecting the induction passage at a point intermediate the air-metering means and the fuel-metering means with the engine lubricant circuit for supplying air to the lubricant circuit, the lubricant circuit otherwise being sealed against the entry of ambient air, and
    second fluid-conduit means interconnecting the lubricant circuit and the induction passage at a point downstream of the air-metering means and cooperating with said first conduit means to provide ventilation to said lubricant circuit.

2. The combination of claim 1, wherein the second fluid conduit means includes a one-way valve preventing fluid flow from the induction passage to the lubricant circuit through the second circuit means.

3. In an internal combustion engine having a fluid lubricant circuit,
    a charge-forming means including
        an induction passage,
        air-metering means in the induction passage responsive to airflow therethrough, and
        fuel-metering means responsive to the air-metering means introducing fuel to the induction passage downstream of the air-metering means,
    fluid-conduit means connecting the induction passage at a point intermediate the air-metering means and the fuel-metering means with the engine lubricant circuit for supplying air to the circuit, the circuit otherwise being sealed against the entry of ambient air.

4. The combination of claim 3, further including a lubricant circuit venting conduit means interconnecting the lubricant circuit and a source of engine vacuum.

5. The combination of claim 3, further comprising lubricant circuit venting means permitting fluid flow from the lubricant circuit and including a one-way valve prohibiting fluid flow into the lubricant circuit through the venting means.